(12) United States Patent
Francois

(10) Patent No.: US 11,408,562 B2
(45) Date of Patent: Aug. 9, 2022

(54) PROCESS AND DEVICE FOR FILLING TANKS WITH PRESSURIZED GAS

(71) Applicant: L'Air Liquide, Societe Anonyme pour l'Etude et l'Exploitation des Procedes Georges Claude, Paris (FR)

(72) Inventor: Thibaut Francois, Sassenage (FR)

(73) Assignee: L'Air Liquide, Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 214 days.

(21) Appl. No.: 16/802,015

(22) Filed: Feb. 26, 2020

(65) Prior Publication Data

US 2020/0271275 A1  Aug. 27, 2020

(30) Foreign Application Priority Data

Feb. 26, 2019 (FR) ..................................... 1901943

(51) Int. Cl.
*F17C 5/06* (2006.01)
*F17C 5/00* (2006.01)

(52) U.S. Cl.
CPC ................ *F17C 5/06* (2013.01); *F17C 5/007* (2013.01); *F17C 2260/038* (2013.01)

(58) Field of Classification Search
CPC ...... F17C 5/06; F17C 5/007; F17C 2260/038; F17C 2201/054; F17C 2201/056; F17C 2201/058; F17C 2205/0142; F17C 2205/0326; F17C 2205/0355; F17C 2205/0364; F17C 2221/012; F17C 222/0123; F17C 2223/036;
(Continued)

(56) References Cited

U.S. PATENT DOCUMENTS 8,671,997 B2   3/2014  Allidieres et al.
8,757,223 B2 * 6/2014  Uemura .................... F17C 5/06
                                                                 141/95
(Continued)

FOREIGN PATENT DOCUMENTS

DE  10 2012 021692   5/2014
DE  10 2012 023329   6/2014
(Continued)

OTHER PUBLICATIONS

WO-2016146912-A1 English Translation of Specification (Year: 2021).*
(Continued)

*Primary Examiner* — Timothy P. Kelly
*Assistant Examiner* — Stephanie A Shrieves
(74) *Attorney, Agent, or Firm* — Christopher J. Cronin

(57) ABSTRACT

Leak testing is performed after filling a first tank with pressurized gas and before filling a second tank with the same via a filling circuit including first and second isolation valves. After the first tank is filled, the pressure of gas trapped between the two closed isolation valves is measured. If the pressure is below a predetermined threshold, the first isolation valve is opened until the pressure reaches or exceeds the predetermined threshold, at which time the first isolation valve is closed and the second isolation valve is opened so that the leak test may be performed. If the pressure is otherwise at or above the threshold, the leak test is performed.

16 Claims, 1 Drawing Sheet

(58) Field of Classification Search
CPC ........ F17C 2225/0123; F17C 2225/036; F17C 2227/0157; F17C 2227/043; F17C 2250/032; F17C 2250/043; F17C 2265/065
USPC ...................................................... 73/40.5 R
See application file for complete search history.

(56) References Cited

U.S. PATENT DOCUMENTS

| | | | |
|---|---|---|---|
| 10,247,358 B2 | 4/2019 | Allidieres | |
| 2003/0209282 A1* | 11/2003 | Satou | F17C 5/00 141/97 |
| 2006/0283237 A1* | 12/2006 | Courrieu | G01M 3/2815 73/49.2 |
| 2012/0267002 A1* | 10/2012 | Kittilsen | F17C 13/02 141/4 |
| 2013/0014855 A1* | 1/2013 | Yahashi | G01M 3/26 141/1 |
| 2016/0010799 A1 | 1/2016 | Adler et al. | |
| 2018/0066799 A1 | 3/2018 | Ravinel et al. | |
| 2018/0073679 A1 | 3/2018 | Roberge et al. | |

FOREIGN PATENT DOCUMENTS

| | | | |
|---|---|---|---|
| EP | 3 271 637 | 1/2018 | |
| FR | 2 928 716 | 9/2009 | |
| FR | 3 033 866 | 9/2016 | |
| FR | 3 033 867 | 9/2016 | |
| WO | WO 2011/049466 | 4/2011 | |
| WO | WO 2015/001208 | 1/2015 | |
| WO | WO-2016146912 A1 * | 9/2016 | ............... F17C 13/04 |
| WO | WO-2016146913 A1 * | 9/2016 | ................ F17C 7/00 |

OTHER PUBLICATIONS

WO-2016146913-A1 English Translation of Specification (Year: 2021).*
French Search Report and Written Opinion (Machine Translation) for FR 1 901 943, dated Nov. 5, 2019.

* cited by examiner

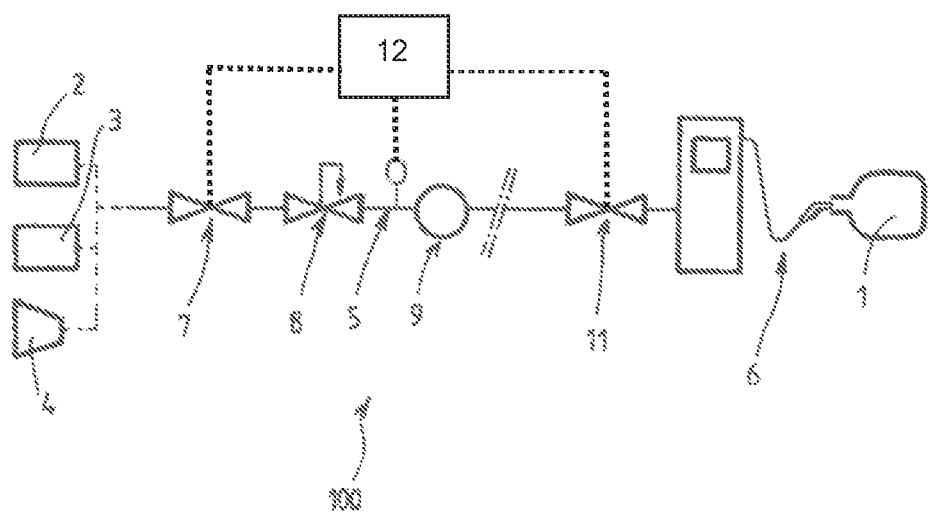

PROCESS AND DEVICE FOR FILLING TANKS WITH PRESSURIZED GAS

CROSS-REFERENCE TO RELATED APPLICATIONS

This application claims the benefit of priority under 35 U.S.C. § 119(a) and (b) to French patent application No. FR 1901943, filed Feb. 26, 2019, the entire contents of which are incorporated herein by reference.

BACKGROUND

Field of the Invention

The invention relates to a process and a device for filling tanks with pressurized gas.

The invention more particularly relates to a process for filling tanks with pressurized gas, in particular pressurized hydrogen, via a filling station comprising at least one source of pressurized gas and a fluid circuit for the transfer of the gas from the at least one source to the tanks, the circuit comprising a first end connected to the at least one gas source and a second end provided with a transfer pipe intended to be joined in removable fashion to the tanks to be filled, the circuit comprising, positioned between the first end and the second end, a first isolation valve, a member for regulation of flow rate or pressure, and a second isolation valve, the process comprising the successive filling of a first tank and then of a second tank, the process comprising, between the filling of the first tank and the filling of the second tank, a leaktightness test on the second tank joined in leaktight fashion to the second end of the circuit, the leak test comprising placing the second tank under pressure via the opening of the second valve, at the end of the filling of the first tank, the first and second isolation valves being closed in order to trap a supply of pressurized gas in the circuit between these two valves.

The invention advantageously applies to the rapid (a few minutes) filling of pressurized hydrogen tanks (between 200 and 1000 bar, for example). The invention applies in particular to the filling of vehicle fuel tanks.

Related Art

Some standards (in particular Standard SAEJ2601) require carrying out a leaktightness test on the tank before it is filled. This leak test consists in pressurizing the tank to be filled (joined in leaktight fashion to the filling circuit) and in measuring one or more pressures in order to detect a leak between the tank, its circuit (its range), the nozzle of the station, the hose and the dispenser.

However, this solution can be ineffective in certain situations. One known method consists in using a source pressure store to carry out this leak test. This method can, however, cause excessively great pressure peaks (amount of gas transferred per unit of time).

The document EP 3 271 637 describes the use of the gas trapped during the preceding filling to carry out the leak test. The document WO2011/049466A1 also describes the use of a volume of gas available in a pipe for a filling.

However, these solutions are ineffective in certain situations. This is because, if the gas trapped in the circuit is at a lower pressure than the pressure prevailing in the tank to be filled, there may be a non-effective leak test (no opening of the appropriate valves) and/or poor filling due to a poor evaluation of the initial pressure in the tank to be filled.

SUMMARY OF THE INVENTION

One aim of the present invention is to overcome all or some of the disadvantages of the prior art noted above.

To this end, the process according to the invention, furthermore in accordance with the generic definition which is given thereof in the above preamble, is essentially characterized in that it comprises a measurement of the pressure of the supply of gas trapped in the circuit between these two valves and, when this measured pressure is greater than a predetermined threshold, the leak test on the second tank is carried out with the gas supply via the opening of the second valve and, when this measured pressure is lower than the predetermined threshold, the process comprises a stage of filling the circuit between the two valves with the gas source via an opening of the first valve, a stage of closing of the first valve when this measured pressure in the circuit between these two valves reaches or exceeds the predetermined threshold, the leak test on the second tank subsequently being carried out with the gas supply via the opening of the second valve.

Thus, the leak test is carried out solely with the volume of gas of the circuit portion and while making sure that there is a sufficient pressure. This makes it possible both to avoid an excessively great pressure peak or poor operation in the event of pressure insufficient to carry out this test.

Furthermore, embodiments of the invention can comprise one or more of the following characteristics:
- the predetermined threshold is between 300 bar and 900 bar and in particular between 700 and 860 bar,
- the predetermined threshold is a pressure value greater than the pressure prevailing in the second tank before it is filled,
- the source comprises at least one pressurized gas storage tank, the stage of filling the circuit between the two valves being carried out by pressure balancing with the said tank,
- at least between the first and second isolation valves, the circuit comprises one or more pipes comprising thermal insulation,
- the circuit comprises, between the first isolation valve and the second isolation valve, a heat exchanger for cooling the gas transferred to the tank to be filled,
- the first isolation valve is positioned in the circuit in a way adjacent to the heat exchanger, that is to say that the first isolation valve is closer to the heat exchanger than to the first end of the circuit and preferably the first isolation valve is located at the inlet of the exchanger,
- the second isolation valve is positioned in the circuit in a way adjacent to the second end of the circuit, that is to say that the second isolation valve is closer to the second end of the circuit than to the heat exchanger,
- the volume of the circuit located between the first and second isolation valves is between 0.00005 $m^3$ and 0.01 $m^3$,
- the length of the circuit between the first and second isolation valves is between one meter and fifty meters and preferably between two and thirty meters.

The invention also relates to a device for filling tanks with pressurized gas, in particular pressurized hydrogen, comprising a filling station comprising at least one source of pressurized gas and a fluid circuit for the transfer of the gas from the at least one source to the tanks, the circuit comprising a first end connected to the at least one gas source and a second end provided with a transfer pipe intended to be joined in removable fashion to the tanks to be filled, the circuit comprising, positioned between the first end and the second end, a first isolation valve, a member for regulation of flow rate or pressure, and a second isolation valve, the station being suitable and configured for carrying out the successive filling of a first tank and then of a second tank, the station comprising an electronic data processing and storage member in order to control the fillings and in particular in order to control the valves, the electronic data processing and storage member being configured in order to carry out, between the filling of the first tank and the filling of the second tank, a leaktightness test on the second tank joined in leaktight fashion to the second end of the circuit, the leak test comprising placing the second tank under pressure via the opening of the second valve, at the end of the filling of the first tank, the electronic data processing and storage member being configured in order to close the first and second isolation valves in order to trap a supply of pressurized gas in the circuit between these two valves, the device comprising a pressure sensor in the circuit between these two valves, the electronic data processing and storage member being configured in order to carry out the leak test on the second tank with the gas supply via the opening of the second valve when the pressure of the gas supply trapped in the circuit between these two valves is greater than a predetermined threshold, and, when this measured pressure is lower than the predetermined threshold, in order to open the first valve in order to fill the circuit between the two valves with the source until the predetermined threshold is reached or exceeded, then subsequently to close the first valve and open the second valve in order to carry out the leak test on the second tank with the filled gas supply.

According to a possible distinctive feature: the circuit comprises, between the first isolation valve and the second isolation valve, a heat exchanger for cooling the gas transferred to the tank to be filled, The invention can also relate to any alternative device or process comprising any combination of the characteristics above or below within the scope of the claims. Other distinctive features and advantages will become apparent on reading the description below, made with reference to the figures, in which:

BRIEF DESCRIPTION OF THE FIGURES

FIG. 1 diagrammatically and partially represents an example of a gas filling station which the invention can implement.

DETAILED DESCRIPTION OF THE INVENTION

The filling station 100 diagrammatically illustrated comprises at least one source 2, 3, 4 of pressurized gas and a fluid circuit 5 for transfer of the gas from the at least one source to the reservoirs 1 to be filled.

The at least one source 2, 3, 4 can comprise, for example, at least one from: a pressurized gas store or pressurized stores positioned in parallel, one or more compressors, and the like. The station 100 can in particular use several pressurized tanks to carry out a filling by successive (cascaded) pressure balancing operations with the tank 1 to be filled (optionally supplemented or assisted by a compressor).

Reference may be made, for example, to the documents FR 2 928 716 A1 and WO 2015001208 A2, which describe, in more detail, structural and operating examples of filling stations.

The circuit 5 comprises at least one first end connected to at least one source 2, 3, 4 of gas (upstream side) and one second end (downstream side) provided with a transfer pipe 6, in particular a hose, intended to be joined in removable fashion to the tanks 1 to be filled.

The circuit 5 comprises, preferably positioned in series from upstream to downstream, between the first end and the second end: a first isolation valve 7, a member 8 for regulation of flow rate or pressure (pressure reducing valve, flow regulating valve, controlled regulator, valve of proportional type or any other appropriate member), a heat exchanger 9 for cooling the gas transferred to the tank 1 to be filled and a second isolation valve 11.

The exchanger 9 (which is optional) is a member in which the gas is cooled to the target temperature. Of course, the arrangement of several exchangers having different structures which make it possible to carry out this cooling can be envisaged.

After the cooling member 9 and the second isolation valve 11, the downstream end of the circuit can comprise, in a known way, sensors, hoses and connections for joining to the tanks 1 of the vehicles to be filled.

The diagrammatic representation of [FIG. 1] describes a minimum of components. Of course, the circuit 5 can conventionally comprise other items of equipment, such as valves, sensors, and the like, inserted or not between the components illustrated in the FIGURE. Likewise, the order of the components can be modified. For example, the first isolation valve 7 can be located between the regulation member 8 and the exchanger 9, indeed even downstream of the exchanger 9.

The station can be used as follows.

During a filling of the tank 1 of a first vehicle, known as "first tank", the end of the process for filling the tank 1 generally takes place in the vicinity of the maximum filling pressure (between 700 bar and 875 bar, for example) with a cooling temperature in the recommended ranges (for example between −17° C. and −40° C.). Once the first tank 1 is completely filled, the filling station 100 can order the closing of the isolation valves 7, 11 of the distribution line.

The cooling member 9 is preferably in a predefined operational mode of waiting for the following vehicle. What this means to say is that a cooling circuit providing frigories to the exchanger 9 can be halted or maintained with a maximum cooling rate or with a reduced cooling rate, with respect to its maximum cooling.

In this way, in the phase of waiting for the following vehicle, the whole of the line or of the lines of the circuit 5 located between the two isolation valves 7, 11 remains under pressure and optionally at a cooled temperature.

What this means to say is that a supply of pressurized and cold gas is trapped in the circuit 5 at the conditions of the final moments (or seconds) of the filling (end of filling).

Thus, when the following vehicle appears, the line of the circuit 5 is kept cold (with the exception of the heat losses). The tank 1 of this second vehicle ("second tank" 1) can be filled.

Conventional preliminary tests (prior to the filling according to the recommendations of the document SAE J2601 or in accordance with any other filling practice or filling standard specific to each operator of a filling station) can be carried out with the trapped gas. In particular, the gas is used to carry out conventional leaktightness tests at a sufficient pressure (and also with a cold temperature).

This thus makes it possible to begin the filling of the following tank with a gas trapped in the circuit 5. This gas, which is already under pressure, can advantageously be already cooled. In this way, a not insignificant part of the lines of the circuit 5 is thus already pre-cooled.

This makes it possible to avoid or to limit the time for starting up the cooling system and the preliminary phase, where the exchange between the gas to be cooled and the exchanger has not yet stabilized.

This also makes it possible to limit the devices which make it possible to prepare pre-cooled gas before the filling, such as, for example, the maintenance of the cooling system at maximum operating conditions or the presence of a permanently operating pre-cooling loop.

In the case, for example, of a filling of a first tank 1 which ends after a time of between 3 min and 5 min. On conclusion of this filling, the isolation valves 7, 11 are closed.

The downstream end of the distribution line (hose in particular) connected to the vehicle can be emptied of its gas (downstream of the second isolation valve 11). On the other hand, between the two isolation valves 7, 11, the length of the circuit can typically be between two metres and thirty metres. This portion is thus filled with hydrogen, for example at a pressure of between 700 bar and 875 bar and at a temperature which can typically be between −40° C. and −17° C. This line is preferably lagged. This thermal insulation is suitable for limiting the heat losses as much as possible and can make it possible to maximize and prolong the effects of the invention.

After a waiting time typically of the order of one to twenty minutes, the gas may have heated up slightly but remains within a cold temperature range (−40° C. to −17° C., for example).

A second vehicle can appear at the station 100. The user can carry out the operations of connecting and authenticating his vehicle. The filling is subsequently begun, for example by pressing on a button or a start indicator.

The first filling stage, for example comprising a leak test, and/or a determination of the characteristics of the tank and of the conditions of the filling line, can be carried out with the gas contained between the isolation valves 7, 11 (in particular via the opening of the second valve 11).

After or during the use of the trapped gas, the process of filling the second tank 11 can be continued with the pressurized gas.

In particular, the station carries out a leaktightness test on the second tank 1 joined in leaktight fashion to the second end of the circuit with the gas trapped in the circuit between the two valves 7, 11.

Thus, at the end of the filling of the first tank 1, the first 7 and second 11 isolation valves are closed in order to trap a pressurized gas supply in the circuit 5 between these two valves 7, 11.

A measurement of the pressure of the gas supply trapped in the circuit 5 between these two valves 7, 11 can be carried out. This pressure measurement can be carried out via one or more pressure sensors 13 in the circuit and/or via an estimation or any other means. This is because this trapped pressure of gas is generally substantially equal to the pressure at the end of filling of the preceding tank (in particular in the case of filling by pressure balancing or "cascade"). This pressure is, for example, the pressure of the tank 1 at the end of filling and/or the pressure of the source at the end of filling.

When this measured pressure is greater than a predetermined threshold, the leak test on the second tank 1 is carried out with the gas supply via the opening of the second valve 11 (the first valve 7 remaining closed).

On the other hand, when this measured pressure is lower than the predetermined threshold, the station carries out beforehand a stage of filling (or of rise in pressure) of the circuit between the two valves 7, 11 with a source 2, 3, 4 of gas via an opening of the first valve 7 (the other valve 11 remaining closed). This filling can be carried out, for example, by pressure balancing with a high-pressure source tank 2.

When this filling or rise in pressure is sufficient (when this pressure in the circuit 5 between these two valves 7, 11 reaches or exceeds the predetermined threshold), the first valve 7 can be closed. The leak test on the second tank 1 can subsequently be carried out with the gas supply via the opening of the second valve 11 (the first valve 7 remaining closed).

The predetermined pressure threshold can be a fixed value between 300 bar and 900 bar and in particular between 700 and 860 bar.

Likewise, this predetermined threshold can be a variable pressure value which is chosen in order to be greater than the pressure in the second tank 1 before filling the latter.

Thus, even if the filling of the first tank 1 has been partial (pressure of end of filling of 300 bar, for example) and if the second tank to be filled arrives with a pressure which is already higher (for example 400 bar), the above process makes it possible to make sure that the leak test will be possible and satisfactory.

Thus, according to this solution, the source (tank 2 at high pressure in particular) is not directly connected to the tank 1 to be filled for the leak test. This makes it possible to avoid excessively great pressure peaks and also to avoid flow rate peaks (which are in particular limited by Standard SAEJ2601).

Furthermore, the above solution makes it possible to guarantee a sufficient pressure in the circuit for an effective and completely safe leak test.

In another aspect of the invention, the device for filling tanks 1 with pressurized gas, in particular pressurized hydrogen, includes a filling station 100 that includes at least one source of pressurized gas 2, 3, 4 and a fluid circuit 5 for the transfer of the gas from the at least one source to the tanks 1. The circuit 5 includes a first end connected to the at least one gas source 2, 3, 4 and a second end provided with a transfer pipe 6 intended to be joined in removable fashion to the tanks 1 to be filled. The circuit 5 also includes, positioned between the first end and the second end, a first isolation valve 7, a member for regulation of flow rate or pressure 8, and a second isolation valve 11. The station 100 is suitable for and configured for carrying out the successive filling of a first tank 1 and then of a second tank 1. The station 100 includes an electronic data processing and storage member 12 for controlling the fillings and in particular in order to control the valves 7, 11. The electronic data processing and storage member 12 is configured to carry out, between the filling of the first tank 1 and the filling of the second tank 1, a leak tightness test on the second tank 1 joined in leak tight fashion to the second end of the circuit 5. The leak test includes placing the second tank 1 under pressure via the opening of the second valve 11. At the end of the filling of the first tank 1, the electronic data processing and storage member 12 is configured to close the first and second isolation valves 7, 11 in order to trap a supply of pressurized gas in the circuit between these two valves 7, 11. The device includes a pressure sensor in the circuit 5 between these two valves 7, 11. The electronic data processing and storage member 12 is configured to carry out the leak test on the second tank 1 with the gas supply 2, 3, 4 via the opening of the second valve 11 when the pressure of the gas supply trapped in the circuit 5 between these two valves 7, 11 is greater than a predetermined threshold, and, when this measured pressure is lower than the predetermined threshold, in order to open the first valve 7 in order to fill the circuit between the two valves 7, 11 with the source until the predetermined threshold is reached or exceeded, then subsequently to close the first valve 7 and open the second valve 11 in order to carry out the leak test on the second tank 1 with the filled gas supply.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and the include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A filling station for filling tanks with pressurized gas, comprising:
   at least one source of pressurized gas
   a fluid circuit for the transfer of the gas from the at least one source to the tanks that comprises a first end connected to the at least one source of pressurized gas, a second end provided with a transfer pipe intended to be joined in removable fashion to the tanks to be filled, a first isolation valve positioned between the first and second ends, a member for regulation of flow rate or pressure, a second isolation valve, and a pressure sensor disposed between the first and second isolation valves and
   an electronic data processing and storage member, wherein:
   the station is suitable for, and configured for, carrying out a filling of a first tank and then a filling of a second tank;
   the electronic data processing and storage member is adapted and configured to control the successive fillings and the first and second isolation valves and carry out a leak test between the filling of the first tank and the filling of the second tank during which the second tank is joined in leaktight fashion to the second end of the circuit;
   the leak test comprises the step of placing the second tank under pressure via an opening of the second isolation valve at the end of the filling of the first tank;
   the electronic data processing and storage member is configured to: a) close the first and second isolation valves in order to trap a supply of pressurized gas in the circuit between these two valves; b) cause performance of said leak test when the pressure of the trapped pressurized gas measured by the pressure sensor is greater than a predetermined threshold; and c) when the pressure of the trapped pressurized gas measured by the pressure sensor is lower than the predetermined threshold, cause the first isolation valve to open in order to fill the circuit between the first and second isolation valves with the pressurized gas from the at least one source of pressurized gas until the predetermined threshold is reached or exceeded; and d) subsequently cause the first isolation valve to close whereupon said performance of said leak test is caused.

2. A process for filling tanks with pressurized gas via a filling station, said process comprising the steps of:
   providing the filling station of claim 1;
   filling a first vehicle tank with the filling station;
   after said step of filling the first vehicle tank, filling a second vehicle tank with the filling station; and
   in between said step of filling of the first vehicle tank and said step of filling of the second vehicle tank, using the electronic data processing and storage member to perform a leak test on the second vehicle tank when a measured pressure of pressurized gas in the circuit trapped between the first and second isolation valves is greater than a predetermined threshold, the second vehicle tank being joined in leaktight fashion to the second end of the circuit, the leak test comprising the steps of:
   closing the first and second isolation valves, using the electronic data processing and storage member, in order to trap a supply of the pressurized gas in the circuit between the first and second isolation valves;
   measuring a pressure of the supply of gas trapped in the circuit between the first and second isolation valves; and
   placing the second tank under pressure via the opening of the second isolation valve at the end of the filling of the first vehicle tank, using the electronic data processing and storage member, wherein, when the measured pressure is lower than the predetermined threshold and before said leak test is performed, the circuit in between the first and second isolation valves is filled with the at least one source of pressurized gas by using the electronic data processing and storage member to open the first isolation valve and when the measured pressure reaches or exceeds the predetermined threshold, the first isolation valve is closed.

3. The process of claim 2, wherein the predetermined threshold is between 300 bar and 900 bar.

4. The process of claim 2, wherein the predetermined threshold is between 700 and 860 bar.

5. The process of claim 2, wherein the predetermined threshold is a pressure value greater than a pressure prevailing in the second tank before the second vehicle tank is filled.

6. The process of claim 2, wherein the at least one source of pressurized gas comprises at least one pressurized gas storage tank and said step of filling the circuit between the first and second isolation valves is carried out by pressure balancing with the at least one pressurized storage tank.

7. The process of claim 2, wherein at least between the first and second isolation valves, the circuit comprises one or more thermally insulated pipes.

8. The process of claim 2, wherein the circuit further comprises, between the first isolation valve and the second isolation valve, a heat exchanger for cooling the pressurized gas being transferred to the first and second vehicle tanks to be filled.

9. The process of claim 8, wherein the first isolation valve is disposed at a position in the circuit adjacent to the heat exchanger so that the first isolation valve is closer to the heat exchanger than the first isolation valve is to the first end of the circuit.

10. The process of claim 9, wherein the first isolation valve is located at an inlet of the heat exchanger.

11. The process of claim 8, wherein the second isolation valve is disposed at a position in the circuit adjacent to the second end of the circuit so that the second isolation valve is closer to the second end of the circuit than the second isolation valve is to the heat exchanger.

12. The process of claim 2, wherein a volume of the circuit in between the first and second isolation valves is between $0.00005 \text{ m}^3$ and $0.01 \text{ m}^3$.

13. The process of claim 2, wherein a length of the circuit between the first and second isolation valves is between one and fifty meters.

14. The process of claim 2, wherein a length of the circuit between the first and second isolation valves is between two and thirty meters.

15. The process of claim 2, wherein the pressurized gas is hydrogen.

16. The device of claim 1, wherein the circuit further comprises a heat exchanger for cooling the pressurized gas transferred to the tank to be filled that is disposed in between the first and second isolation valves.

* * * * *